United States Patent
Tu et al.

(10) Patent No.: US 11,892,673 B2
(45) Date of Patent: Feb. 6, 2024

(54) DIMMING ASSEMBLY, BACKLIGHT MODULE, AND LIQUID CRYSTAL DISPLAY DEVICE

(71) Applicants: Fuzhou BOE Optoelectronics Technology Co., Ltd., Fujian (CN); BOE TECHNOLOGY GROUP CO., LTD., Beijing (CN)

(72) Inventors: Xiaoyan Tu, Beijing (CN); Ting Cui, Beijing (CN); Chengkun Liu, Beijing (CN); Hongyu Zhao, Beijing (CN); Ming Li, Beijing (CN); Shaochuan Ouyang, Beijing (CN); Dingjie Zheng, Beijing (CN); Yuhang Lin, Beijing (CN); Hui Yu, Beijing (CN); Long Hu, Beijing (CN); Han Zhang, Beijing (CN); Liri Chen, Beijing (CN); Jie Liu, Beijing (CN); Panhong Xu, Beijing (CN); Ming Chen, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

( * ) Notice: Subject to any disclaimer, the term of this patent is extended or adjusted under 35 U.S.C. 154(b) by 28 days.

(21) Appl. No.: 17/765,797

(22) PCT Filed: Mar. 9, 2021

(86) PCT No.: PCT/CN2021/079722
§ 371 (c)(1),
(2) Date: Mar. 31, 2022

(87) PCT Pub. No.: WO2021/208638
PCT Pub. Date: Oct. 21, 2021

(65) Prior Publication Data
US 2022/0404541 A1 Dec. 22, 2022

(30) Foreign Application Priority Data
Apr. 17, 2020 (CN) .......................... 202020583969.7

(51) Int. Cl.
*F21V 8/00* (2006.01)

(52) U.S. Cl.
CPC ................................. *G02B 6/0051* (2013.01)

(58) Field of Classification Search
CPC ... G02B 6/0053; G02B 6/0038; G02B 6/0016
See application file for complete search history.

(56) References Cited

U.S. PATENT DOCUMENTS 9,329,328 B2   5/2016   Chen et al.
2005/0069678 A1*  3/2005  Olczak ................. G02B 5/0236
                                                                428/156
(Continued)

FOREIGN PATENT DOCUMENTS

CN   101504470 A   8/2009
CN   101738656 A   6/2010
(Continued)

*Primary Examiner* — Eric T Eide
(74) *Attorney, Agent, or Firm* — IP & T GROUP LLP

(57) ABSTRACT

A dimming assembly includes a first prism having a first surface and a second surface opposite to each other, and a second prism disposed on a side where the second surface of the first prism is located. The first surface includes first dimming portions, each of which includes two first side surfaces. Edges of the two first side surfaces away from the second surface intersect at a first intersection line. A surface of the second prism proximate to the second surface includes second dimming portions, each of which includes two second side surfaces. Edges of the two second side surfaces proximate to the second surface intersect at a second intersection line. A distance between orthographic projections of two adjacent first intersection lines on the second surface is (Continued)

less than a distance between orthographic projections of two adjacent second intersection lines on the second surface.

19 Claims, 9 Drawing Sheets

(56) References Cited

U.S. PATENT DOCUMENTS

| | | | |
|---|---|---|---|
| 2006/0146571 A1* | 7/2006 | Whitney | G02B 6/0053 362/615 |
| 2010/0165243 A1* | 7/2010 | Yoon | G02B 6/0053 362/606 |
| 2012/0169965 A1 | 7/2012 | Tang et al. | |
| 2015/0226972 A1 | 8/2015 | Wang | |
| 2016/0313496 A1* | 10/2016 | Hirayama | G02B 6/0055 |
| 2016/0363711 A1* | 12/2016 | Meyers | G02B 6/0038 |
| 2020/0301204 A1 | 9/2020 | Wang et al. | |
| 2021/0096427 A1* | 4/2021 | Yagi | G02B 6/0036 |
| 2021/0116628 A1* | 4/2021 | Tsuji | G02B 5/0278 |
| 2021/0311242 A1* | 10/2021 | Yagi | G02F 1/133524 |

FOREIGN PATENT DOCUMENTS

| | | |
|---|---|---|
| CN | 201935118 U | 8/2011 |
| CN | 102230591 A | 11/2011 |
| CN | 104698518 A | 6/2015 |
| CN | 107132697 A | 9/2017 |
| CN | 211979374 U | 11/2020 |

* cited by examiner

DIMMING ASSEMBLY, BACKLIGHT MODULE, AND LIQUID CRYSTAL DISPLAY DEVICE

CROSS-REFERENCE TO RELATED APPLICATIONS

This application is a national phase entry under 35 USC 371 of International Patent Application No. PCT/CN2021/079722 filed on Mar. 9, 2021, which claims priority to Chinese Patent Application No. 202020583969.7, filed on Apr. 17, 2020, which are incorporated herein by reference in their entirety.

TECHNICAL FIELD

The embodiments of the present disclosure relate to a dimming assembly, a backlight module and a liquid crystal display device.

BACKGROUND

A liquid crystal display device mainly includes a liquid crystal panel and a backlight module. The backlight module is one of key components of the liquid crystal display device, and a function of the backlight module is to provide a surface light source for the liquid crystal panel, so that the liquid crystal panel may display images normally.

SUMMARY

In one aspect, a dimming assembly is provided. The dimming assembly includes a first prism and a second prism. The first prism has a first surface and a second surface opposite to each other. The first surface includes a plurality of first dimming portions. Each first dimming portion includes two first side surfaces, and edges of the two first side surfaces away from the second surface intersect at a first intersection line. The second prism is disposed on a side where the second surface of the first prism is located, and a surface of the second prism proximate to the second surface includes a plurality of second dimming portions. Each second dimming portion includes two second side surfaces, and edges of the two second side surfaces proximate to the second surface intersect at a second intersection line. A distance between orthographic projections of two adjacent first intersection lines on the second surface is less than a distance between orthographic projections of two adjacent second intersection lines on the second surface.

In some embodiments, the plurality of first dimming portions include first-type dimming portions and second-type dimming portions. A dimension of a first-type dimming portion in a direction perpendicular to the second surface is less than a dimension of a second-type dimming portion in the direction perpendicular to the second surface.

In some embodiments, the first-type dimming portions and the second-type dimming portions are alternately arranged in sequence.

In some embodiments, the plurality of first dimming portions are parallel to each other; and/or the plurality of second dimming portions are parallel to each other.

In some embodiments, an acute angle between an extending direction of an orthographic projection of the first intersection line on the second surface and an extending direction of an orthographic projection of the second intersection line on the second surface is greater than 0 degrees and less than 10 degrees.

In some embodiments, the acute angle is 9 degrees or 9.5 degrees.

In some embodiments, one of the two first side surfaces is at a first angle to the second surface, another of the two first side surfaces is at a second angle to the second surface, and a difference between the first angle and the second angle is equal to or greater than 0 degrees and 0.1 times of any one of the two angles; and/or one of the two second side surfaces is at a third angle to the second surface, another of the two second side surfaces is at a fourth angle to the second surface, and a difference between the third angle and the fourth angle is equal to or greater than 0 degrees and less than 0.1 times of any one of the two angles.

In some embodiments, an included angle between the two first side surfaces is in a range of 60 degrees to 120 degrees, inclusive; and/or an included angle between the two second side surfaces is in a range of 60 degrees to 120 degrees, inclusive.

In some embodiments, the distance between the orthographic projections of the two adjacent first intersection lines on the second surface is in a range of 20 μm to 28 μm, inclusive; and/or the distance between the orthographic projections of the two adjacent second intersection lines on the second surface is in a range of 30 μm to 60 μm, inclusive.

In some embodiments, the distance between the orthographic projections of the two adjacent first intersection lines on the second surface is 24 μm; and the distance between the orthographic projections of the two adjacent second intersection lines on the second surface is 50 μm.

In some embodiments, a maximum dimension of the first prism in a direction perpendicular to the second surface is in a range of 0.1035 mm to 0.1265 mm, inclusive; and/or a maximum dimension of the second prism in the direction perpendicular to the second surface is in a range of 0.252 mm to 0.308 mm, inclusive.

In some embodiments, the maximum dimension of the first prism is 0.115 mm, and/or the maximum dimension of the second prism is 0.28 mm.

In some embodiments, the dimming assembly further includes a diffusion sheet disposed on a side of the second prism away from the first prism. The diffusion sheet is configured to diffuse light transmitted therethrough, and direct diffused light to the second prism.

In some embodiments, a dimension of the diffusion sheet in a direction perpendicular to the second surface is in a range of 0.1305 mm to 0.1595 mm, inclusive.

In some embodiments, the dimension of the diffusion sheet is 0.145 mm.

In some embodiments, a dimension of the diffusion sheet in a direction perpendicular to the second surface is in a range of 0.1125 mm to 0.1375 mm, inclusive.

In some embodiments, the dimension of the diffusion sheet is 0.125 mm.

In another aspect, a backlight module is provided. The backlight module includes the dimming assembly as described in any one of the above embodiments, and a light source assembly configured to provide light and direct the light toward the dimming assembly.

In some embodiments, the light source assembly includes a light guide plate disposed on a side of the dimming assembly, a reflection plate disposed on a side of the light guide plate away from the dimming assembly, and a side-type light source configured to provide the light and direct the light toward the light guide plate from at least one side surface of the light guide plate.

In still another aspect, a liquid crystal display device is provided. The liquid crystal display device includes the backlight module as described in any one of the above embodiments, and a liquid crystal panel disposed on a side of the backlight module.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these accompanying drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1A:
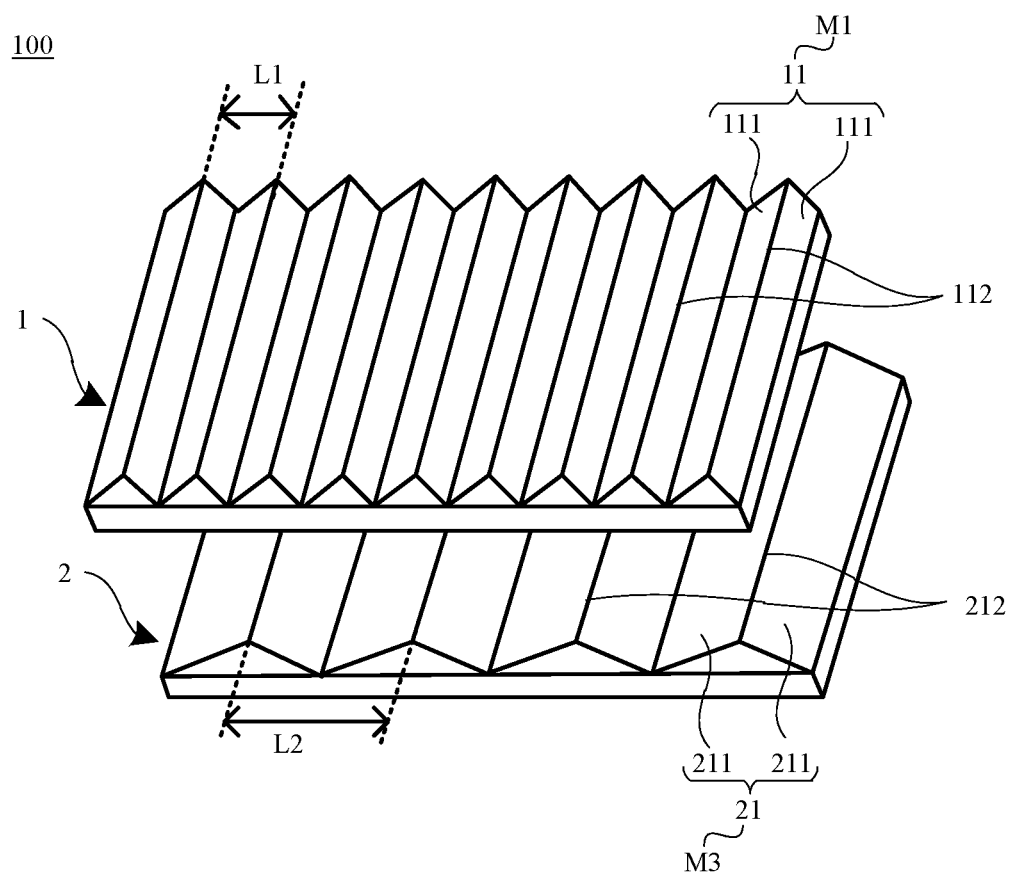
FIG. 1A is a structural diagram of a dimming assembly, in accordance with some embodiments of the present disclosure.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, features defined with "first" and "second" may explicitly or implicitly include one or more of the features. In the description of the embodiments of the present disclosure, the term "a plurality of/the plurality of" means two or more unless otherwise specified.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the terms such as "about" or "approximately" includes a stated value and an average value within an acceptable deviation range of a specific value. The acceptable deviation range is determined by a person of ordinary skill in the art in view of the measurement in question and the error associated with the measurement of a particular quantity (i.e., limitations of the measurement system).

Exemplary embodiments are described herein with reference to sectional views and/or plan views as idealized exemplary drawings. In the accompanying drawings, thicknesses of layers and regions are enlarged for clarity. Therefore, variations in shape with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a feature of being curved. Therefore, the regions shown in the accompanying drawings are schematic in nature, and their shapes are not intended to show actual shapes of the regions in a device, and are not intended to limit the scope of the exemplary embodiments.

A liquid crystal display device mainly includes a backlight module and a liquid crystal panel disposed on a light-exit side of the backlight module. In an example, the backlight module adopts a "diffusion sheet-diffusion sheet-prism" (DDP) structure. That is, the backlight module mainly includes a light-emitting assembly, and two diffusion sheets and a single prism that are sequentially disposed on a light-exit side of the light-emitting assembly. During display, light emitted by the light-emitting assembly passes through the two diffusion sheets and the prism in sequence, and then is directed toward the liquid crystal panel, so that the liquid crystal panel can display images normally.

However, in a case where the backlight module adopts the DDP structure, light-emitting brightness of the backlight module is weak, which in turn causes brightness gain of the liquid crystal panel to be small. In an example, in order to reduce light loss and increase the brightness gain, the following three implementation solutions are adopted. A first implementation solution is to improve light-emitting efficiency of the light-emitting assembly (such as light-emitting diodes). A second implementation solution is to adopt a reflection plate with high reflectivity, so as to effectively reflect the light emitted by the light-emitting assembly to the DDP structure. A third implementation solution is to provide a dual brightness enhancement film (DBEF) on the light-exit side of the light-emitting assembly. However, the above three solutions have high costs and poor economy. Moreover, the DBEF in the third solution has a large thickness, which thickens the entire backlight module, and then causes a rubber frame of the backlight module to be re-molded in order to support the liquid crystal panel, thereby increasing a mold preparation cost of the rubber frame.

Figure 1B:
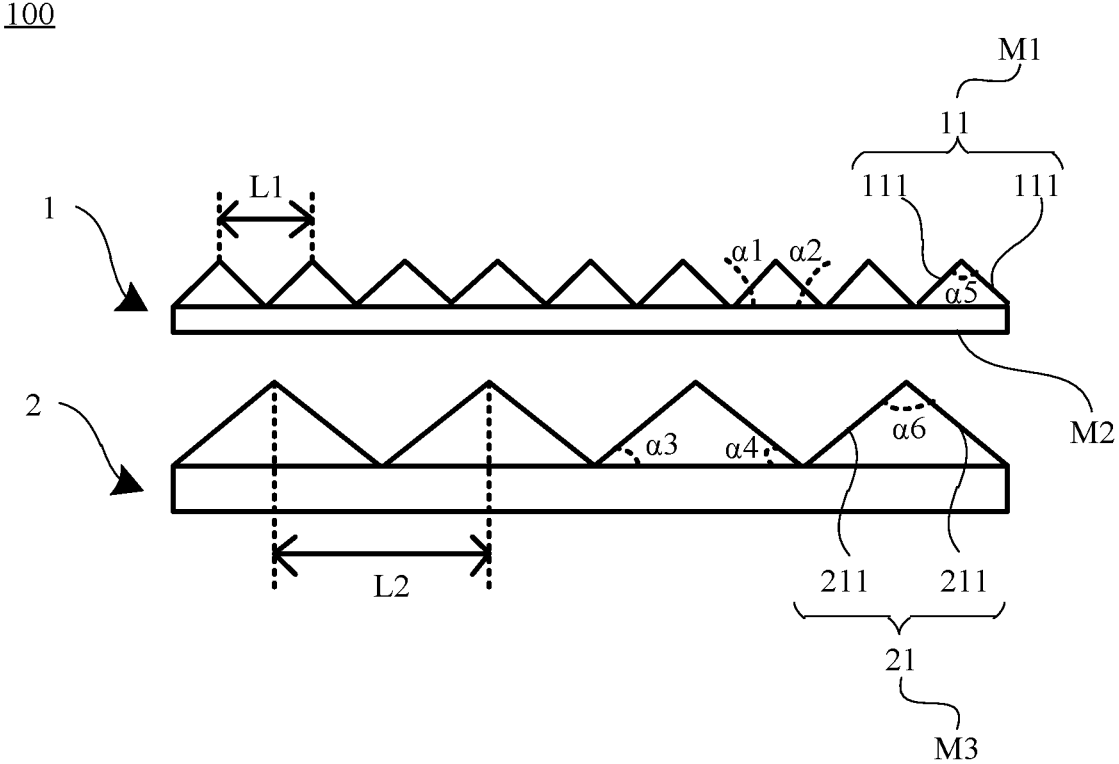
FIG. 1B is a front view of the dimming assembly in FIG. 1A.

Based on this, some embodiments of the present disclosure provide a dimming assembly 100, which may be applied to the backlight module of the liquid crystal display device to replace the DDP structure. As shown in FIGS. 1A and 1B, the dimming assembly 100 includes a first prism 1 and a second prism 2. In a case where the dimming assembly 100 is applied to a backlight module 200, with reference to FIG. 2, the dimming assembly 100 may be disposed on a light-exit side of a light-emitting assembly 300. That is, the second prism 2 and the first prism 1 may be sequentially disposed on the light-exit side of the light-emitting assembly 300. In some examples, the first prism 1 and the second prism 2 of the dimming assembly 100 may replace the prism and a diffusion sheet adjacent to the prism of the DDP structure.

As shown in FIGS. 1A and 1B, the first prism 1 has a first surface M1 and a second surface M2 opposite to each other. The first surface M1 includes a plurality of first dimming portions 11. Each first dimming portion 11 includes two first side surfaces 111, and edges of the two first side surfaces 111 away from the second surface M2 intersect at a first intersection line 112. The second prism 2 is disposed on a side where the second surface M2 of the first prism 1 is located.

A surface M3 of the second prism 2 proximate to the second surface M2 includes a plurality of second dimming portions 21.

Each second dimming portion 21 includes two second side surfaces 211, and edges of the two second side surfaces 211 proximate to the second surface M2 intersect at a second intersection line 212. A distance L1 between orthographic projections of two adjacent first intersection lines 112 on the second surface M2 is less than a distance L2 between orthographic projections of two adjacent second intersection lines 212 on the second surface M2. It will be noted that the second surface M2 may be a plane or an approximate plane. For example, protrusions or depressions caused by a manufacturing process are allowed to exist in the approximate plane.

Figure 2:
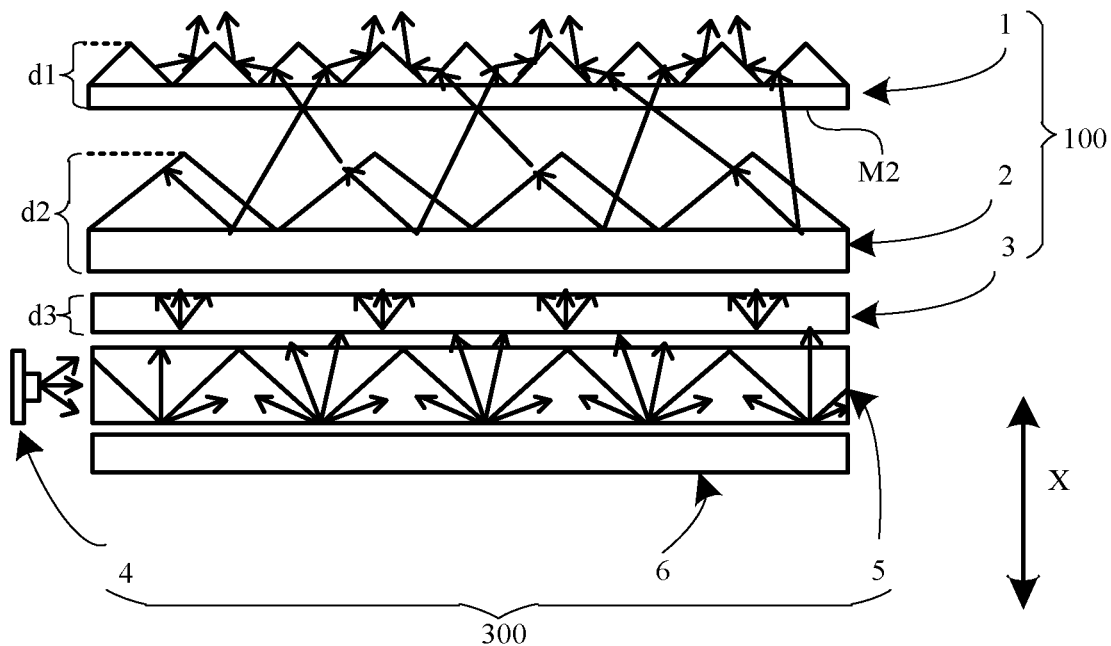
FIG. 2 is a structural diagram of a backlight module, in accordance with some embodiments of the present disclosure.

With reference to FIGS. 1A, 1B and 2, light emitted by the light-emitting assembly 300 may sequentially pass through the second prism 2 and the first prism 1. Outgoing light passing through the two first side surfaces 111 of the first dimming portion 11 may be refracted in a direction proximate to the first intersection line 112, and outgoing light passing through the two second side surfaces 211 of the second dimming portion 21 may be refracted in a direction proximate to the second intersection line 212. Therefore, the first prism 1 and the second prism 2 may narrow a light-emitting angle of the light emitted by the light-emitting assembly 300 from different directions (for example, a horizontal direction and a vertical direction) respectively or a same direction, so as to improve overall light-emitting brightness of the backlight module 200. Therefore, the brightness gain of the liquid crystal panel of the liquid crystal display device may be improved. That is, contrast of the liquid crystal display device may be improved, which enhances a display effect. Moreover, this arrangement does not thicken the entire backlight module, or increase the mold preparation cost of the rubber frame, which has advantages of low costs and high economy.

In addition, in these embodiments, by setting the distance L1 between the orthographic projections of the two adjacent first intersection lines 112 on the second surface M2 to be less than the distance L2 between the orthographic projections of the two adjacent second intersection lines 212 on the second surface M2, the second prism 2 may have a better light-gathering effect than the first prism 1; and the first prism 1 may not only further concentrate light based on the second prism 2 to improve the brightness, but also play a good role in shielding. Therefore, light emitted in different directions may be converged by the first prism 1 and the second prism 2, so as to improve the light-emitting brightness of the backlight module; in addition, it may alleviate a problem of excessive narrowing of viewing angles of the liquid crystal display device in various directions, thereby enabling the liquid crystal display device to have advantages of both high brightness gain and a wide viewing angle.

In some examples, as shown in FIGS. 1A and 1B, the plurality of first dimming portions 11 are parallel to each other; and/or the plurality of second dimming portions 21 are parallel to each other. In a case where the plurality of first dimming portions 11 are parallel to each other, it may be possible to improve uniformity of light after the light passes through the first prism 1. That is, it is conductive to avoiding an excessive convergence of local light. Similarly, in a case where the plurality of second dimming portions 21 are parallel to each other, it may be possible to improve uniformity of light after the light passes through the second prism 2. That is, it is conductive to avoiding an excessive convergence of local light. In a case where the plurality of first dimming portions 11 are parallel to each other, and in the meantime the plurality of second dimming portions 21 are parallel to each other, it may be possible to achieve a good dimming effect. That is, it may not only increase the brightness gain to meet a horizontal viewing angle requirement and a vertical viewing angle requirement, but also improve brightness uniformity.

It will be noted that each first dimming portion 11 should include at least the two first side surfaces 111. That is, the first dimming portion 11 may further include other surfaces in addition to the two first side surfaces 111, which is not limited in the embodiments. Similarly, each second dimming portion 21 should include at least two second side surfaces 211. That is, the second dimming portion 21 may further include other surfaces in addition to the two second side surfaces 211, which is not limited in the embodiments.

The first side surfaces 111 and the second side surfaces 211 may be set according to actual dimming requirements (for example, the light-gathering effect or a shielding effect). For example, each first side surface 111 is a plane or a curved surface, and each second side surface 211 is a plane or a curved surface. Some embodiments of the present disclosure are described by taking an example where the first side surfaces 111 and the second side surfaces 211 are both planes.

For example, with reference to FIG. 1B, one of the two first side surfaces 111 of each first dimming portion 11 is at a first angle $\alpha 1$ to the second surface M2, the other one of the two first side surfaces 111 of each first dimming portion 11 is at a second angle $\alpha 2$ to the second surface M2, and the first angle $\alpha 1$ is substantially equal to the second angle $\alpha 2$; and/or one of the two second side surfaces 211 of each second dimming portion 21 is at a third angle $\alpha 3$ to the second surface M2, the other one of the two second side surfaces 211 of each second dimming portion 21 is at a fourth angle $\alpha 4$ to the second surface M2, and the third angle $\alpha 3$ is substantially equal to the fourth angle $\alpha 4$. The "is substantially equal to" may mean that the two angles are equal to each other, or a difference between the two angles is less than 0.1 times of any one of the two angles.

In a case where the first angle $\alpha 1$ is substantially equal to the second angle $\alpha 2$, it may be possible to make convergence angles of light exiting from the two first side surfaces 111 of each first dimming portion 11 substantially equal to each other, thereby facilitating an improvement of light-emitting uniformity of the first prism 1. Similarly, in a case where the third angle $\alpha 3$ is substantially equal to the fourth angle $\alpha 4$, it may be possible to make convergence angles of the light exiting from the two second side surfaces 211 of each second dimming portion 21 substantially equal to each other, thereby facilitating an improvement of light-emitting uniformity of the second prism 2.

For example, with reference to FIG. 1B, an included angle $\alpha 5$ between the two first side surfaces 111 of each first dimming portion 11 is in a range of 60 degrees to 120 degrees; and/or an included angle $\alpha 6$ between the two second side surfaces 211 of each second dimming portion 21 is in a range of 60 degrees to 120 degrees. In this way, it may be possible to achieve a good light-gathering effect by using the first dimming portion 11 and the second dimming portion 21, thereby improving the light-emitting brightness of the backlight module.

Figure 3A:
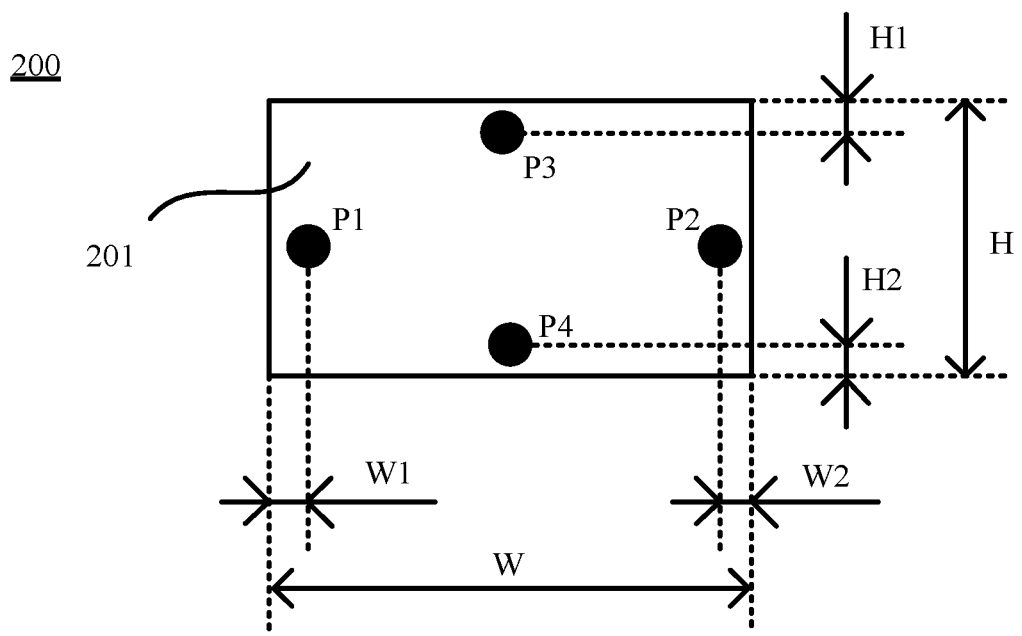
FIG. 3A is a structural diagram of a display region of a liquid crystal display device, in accordance with some embodiments of the present disclosure.
Figure 3B:
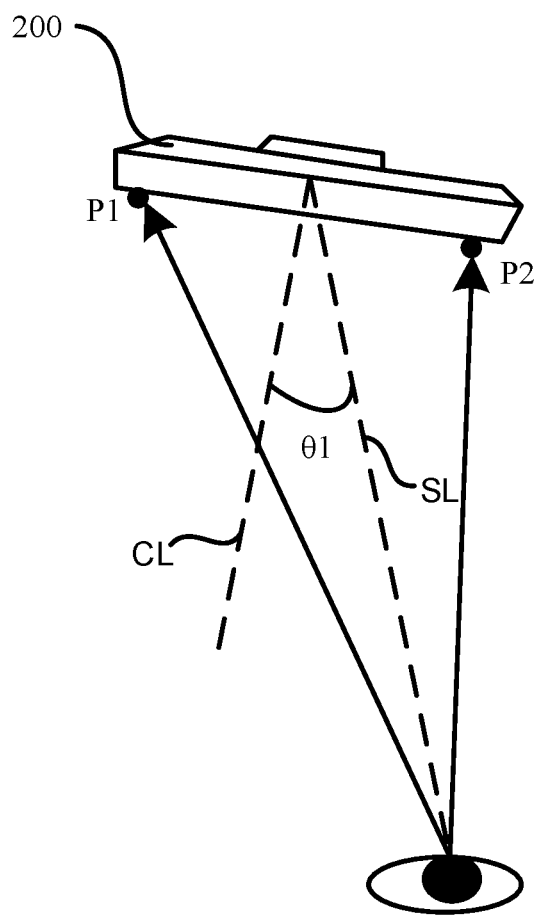
FIG. 3B is an observation diagram of the liquid crystal display device in FIG. 3A when a horizontal viewing angle is measured.
Figure 3C:
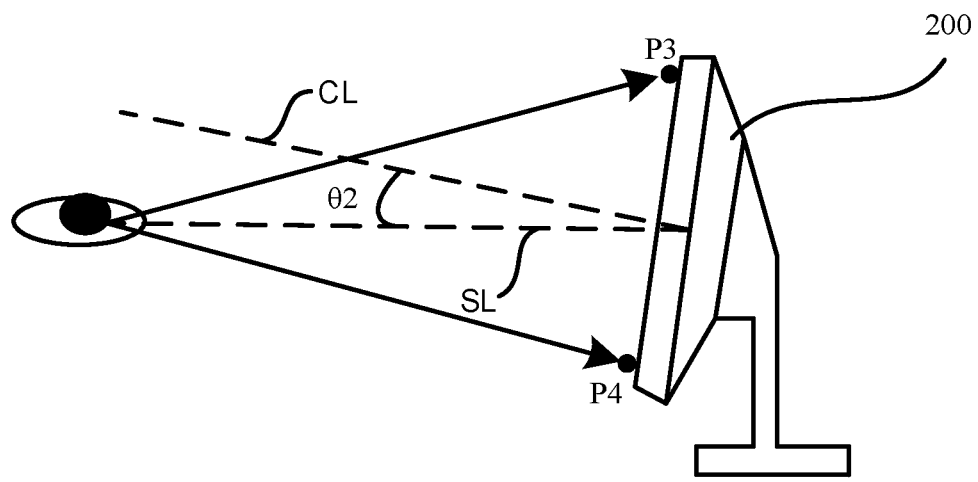
FIG. 3C is an observation diagram of the liquid crystal display device in FIG. 3A when a vertical viewing angle is measured.

It will be noted that when a human eye views the liquid crystal display device, a frequency and a range of left and right movements of the eye are generally greater than a frequency and a range of up and down movements thereof, respectively. Therefore, a horizontal viewing angle of the liquid crystal display device shall be greater than a vertical viewing angle thereof as much as possible. For example, with reference to FIG. 3A, in a case where a display region 201 of the liquid crystal display device 200 is in a shape of a rectangle, when a viewing distance (a vertical distance from the human eye to the liquid crystal display device 200) is 1.5 times a diagonal length of the display region 201, a viewing effect is good. Therefore, such a viewing distance may be taken as a measurement distance. In this case, as shown in FIG. 3B, when an included angle $\theta 1$ between a sight line SL and a central line CL of the display region 201 is 30 degrees after the human eye moves left or right, if a brightness difference (that is, a ratio of a large one of two brightness values to a small one of the two brightness values) at two opposite positions (for example, a first position P1 and a second position P2 as shown in FIG. 3A, where a dimension of the display region 201 in the horizontal direction is W, a distance between the first position P1 and one border of the display region 201 in the horizontal direction is W1, a distance between the second position P2 and the other border of the display region 201 in the horizontal direction is W2, and W1=W2) seen in the display region 201 in the horizontal direction is greater than a preset value, a viewing angle of the liquid crystal display device in the horizontal direction may be considered to be relatively small, and not meet a horizontal viewing angle requirement. As shown in FIG. 3C, when an angle $\theta 2$ between a sight line SL and the central line CL of the display region is 15 degrees after a human eye moves up or down, if a brightness difference (that is, a ratio of a large one of two brightness values to a small one of the two brightness values) at two opposite positions (for example, a third position P3 and a fourth position P4 as shown in FIG. 3A, where a dimension of the display region 201 in the vertical direction is H, a distance between the third position P3 and one border of the display region 201 in the vertical direction is H1, a distance between the fourth position P4 and the other border of the display region 201 in the vertical direction is H2, and H1=H2) seen in the display region 201 in the vertical direction is greater than the preset value, a viewing angle of the liquid crystal display device in the vertical direction may be considered to be relatively small, and not meet a vertical viewing angle requirement. The following embodiments of the present disclosure will be described by taking an example where the preset value is 1.73. Herein, a value that is less than or equal to the preset value may be referred to as a standard value.

In some embodiments, with reference to FIGS. 1A, 1B and 2, a distance L1 between orthographic projections of two adjacent first intersection lines 112 on the second surface M2 (that is, a pitch value of the first prism) is in a range of 20 μm to 28 μm, inclusive. For example, the distance L1 may be 20 μm, 24 μm, or 28 μm; and/or a distance L2 between orthographic projections of two adjacent second intersection lines 212 on the second surface M2 (that is, a pitch value of the second prism) is in a range of 30 μm to 60 μm, inclusive. For example, the distance L2 may be 30 μm, 38 μm, 50 μm, or 60 μm.

Figure 4:
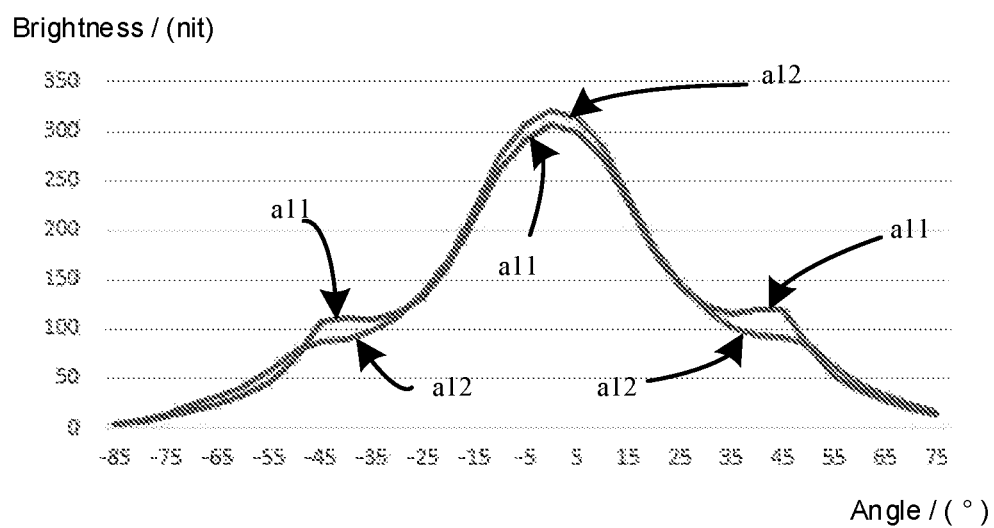
FIG. 4 is a comparison diagram of curves of brightness versus horizontal viewing angle for two dimming assemblies, in accordance with some embodiments of the present disclosure.

With reference to Table 1 and FIG. 4, by taking an example where the first intersection line is set to be horizontal, and the second intersection line is set to be vertical, Table 1 shows experimental data in a case where L1 is 24 μm (L1=24 μm) and L2 is 50 μm (L2=50 μm), and in the other case where L1 is 50 μm (L1=50 μm) and L2 is 24 μm (L2=24 μm). FIG. 4 shows a comparison diagram of curves of brightness versus horizontal viewing angle for the two cases in Table 1, where all is a curve of brightness versus horizontal viewing angle for the case where L1=24 μm and L2=50 μm, and α12 is a curve of brightness versus horizontal viewing angle fir the other case where L1=50 μm and L2=24 μm.

TABLE 1

| L1, L2 | Viewing angle | Lmax | Lmin | Brightness difference (Lmax/Lmin) | Result |
|---|---|---|---|---|---|
| L1 = 24 μm, L2 = 50 μm | Left 30 degrees | 169.9 | 103.8 | 1.6368 | |
| | Right 30 degrees | 165.3 | 97.05 | 1.7032 | |
| | Horizontal viewing angle | Standard value ≤ 1.73 | | 1.67 | Qualified |
| | Up 15 degrees | 229.7 | 187.6 | 1.2244 | |
| | Down 15 degrees | 226.8 | 194.6 | 1.1655 | |
| | Vertical viewing angle | Standard value ≤ 1.73 | | 1.2244 | Qualified |
| L1 = 50 μm, L2 = 24 μm | Left 30 degrees | 177.3 | 79.78 | 2.2224 | |
| | Right 30 degrees | 167.8 | 75.98 | 2.2085 | |
| | Horizontal viewing angle | Standard value ≤ 1.73 | | 2.2154 | Unqualified |
| | Up 15 degrees | 237.7 | 152 | 1.5638 | |
| | Down 15 degrees | 232.6 | 171.8 | 1.3539 | |
| | Vertical viewing angle | Standard value ≤ 1.73 | | 1.5638 | Qualified |

It will be seen from Table 1 that, in the case where L1=50 μm and L2=24 μm, a brightness difference at an upward shift of 15 degrees is 1.5638, a brightness difference at a downward shift of 15 degrees is 1.3539, and a maximum value 1.5638 of the two brightness differences which is less than 1.73 is taken according to the vertical viewing angle requirement, so the vertical viewing angle requirement is met in this case; a brightness difference at a leftward shift of 30 degrees is 2.2224, a brightness difference at a rightward shift of 30 degrees is 2.2085, and an average value 2.2154 of the two brightness differences which is greater than 1.73 is taken according to the horizontal viewing angle requirement, so the horizontal viewing angle requirement is not met in this case.

In the case where L1=24 μm and L2=50 μm, a brightness difference at an upward shift of 15 degrees is 1.2244, a brightness difference at a downward shift of 15 degrees is 1.1655, and a maximum value 1.2244 of the two brightness differences which is less than 1.73 is taken according to the vertical viewing angle requirement, so the vertical viewing angle requirement is met in this case; a brightness difference at a leftward shift of 30 degrees is 1.6368, a brightness difference at a rightward shift of 30 degrees is 1.7032, and an average value 1.67 of the two brightness differences which is less than 1.67 is taken according to the horizontal viewing angle requirement, so the horizontal viewing angle requirement is met in this case.

In addition, in conjunction with FIG. 4, it will be seen from the curves of brightness versus horizontal viewing angle from negative 85 degrees to positive 75 degrees (−85 degrees to +75 degrees) that, when values of L1 and L2 are changed, the brightness in the horizontal viewing angle will vary greatly. In the case where L1=50 μm, and L2=24 μm, a central brightness gain greater than 4% may be achieved, but the horizontal viewing angle is very poor, that is, the brightness difference in the horizontal viewing angle is 2.2154 which is much greater than 1.73. Therefore, it is difficult to meet actual use requirements. In the case where L1=24 μm and L2=50 μm, the brightness difference in the horizontal viewing angle is 1.67 which is less than 1.73. Therefore, it may be possible to obtain a good horizontal viewing angle.

According to the above analysis, in these embodiments, in the case where the first intersection line is set to be horizontal, the second intersection line is set to be vertical, L1=24 μm, and L2=50 μm, both the horizontal viewing angle requirement and the vertical viewing angle requirement may be met.

Figure 5:
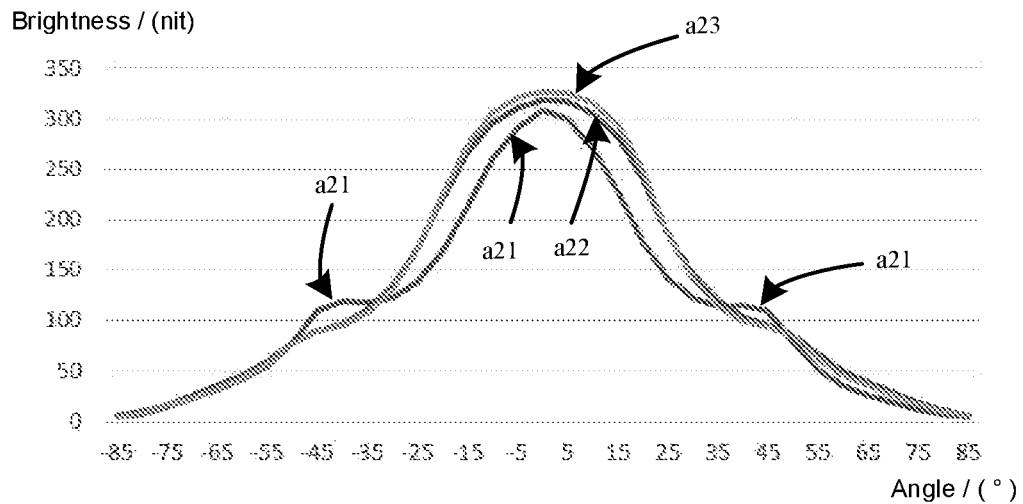
FIG. 5 is a comparison diagram of curves of brightness versus horizontal viewing angle for three dimming assemblies, in accordance with some embodiments of the present disclosure.

With reference to Table 2 and FIG. 5, by taking an example where the first intersection line and the second intersection line are both set to be horizontal, and L2 is 50 μm (L2=50 μm), Table 2 shows experimental data in three cases where L1 is separately 24 μm, 38 μm and 50 μm. FIG. 5 shows a comparison diagram of curves of brightness versus horizontal viewing angle for the three cases in Table 2, where α21 is a curve of brightness versus horizontal viewing angle for the case where L1=24 μm, α22 is a curve of brightness versus horizontal viewing angle for the case where L1=38 μm, and α23 is a curve of brightness versus horizontal viewing angle fir case where L1=50 μm.

TABLE 2

| L1 | Viewing angle | Lmax | Lmin | Brightness difference (Lmax/Lmin) | Result |
|---|---|---|---|---|---|
| 24 μm | Left 30 degrees | 169.6 | 105.1 | 1.6137 | |
| | Right 30 degrees | 168.5 | 95.99 | 17554 | |
| | Horizontal viewing angle | Standard value ≤ 1.73 | | 1.6846 | Qualified |
| | Up 15 degrees | 228.5 | 190.6 | 1.1988 | |
| | Down 15 degrees | 230.5 | 195.8 | 1.1772 | |
| | Vertical viewing angle | Standard value ≤ 1.73 | | 1.1988 | Qualified |
| 38 μm | Left 30 degrees | 223.7 | 88.27 | 2.5343 | |
| | Right 30 degrees | 221.4 | 82.45 | 2.6853 | |
| | Horizontal viewing angle | Standard value ≤ 1.73 | | 2.6098 | Unqualified |
| | Up 15 degrees | 260.4 | 156.4 | 1.665 | |
| | Down 15 degrees | 258.7 | 164.6 | 1.5717 | |
| | Vertical viewing angle | Standard value ≤ 1.73 | | 1.665 | Qualified |
| 50 μm | Left 30 degrees | 233.8 | 84.98 | 2.7512 | |
| | Right 30 degrees | 228.2 | 80.56 | 2.8327 | |
| | Horizontal viewing angle | Standard value ≤ 1.73 | | 2.792 | Unqualified |
| | Up 15 degrees | 271.6 | 150.5 | 1.8047 | |
| | Down 15 degrees | 255.5 | 175.7 | 1.4542 | |
| | Vertical viewing angle | Standard value ≤ 1.73 | | 1.8047 | Unqualified |

It will be seen from Table 2 that, in the case where L1=24 μm, a brightness difference at an upward shift of 15 degrees is 1.1988, a brightness difference at a downward shift of 15 degrees is 1.1772, and a maximum value of the two brightness differences 1.1988 which is less than 1.73 is taken according to the vertical viewing angle requirement, so the vertical viewing angle requirement is met in this case; a brightness difference at a leftward shift of 30 degrees is 1.6137, a brightness difference at rightward shift of 30 degrees is 1.7554, and an average value of the two brightness differences is 1.6846 which is less than 1.73 is taken according to the horizontal viewing angle requirement, so the horizontal viewing angle requirement is also met in this case.

In the case where L1=38 μm, a brightness difference at an upward shift of 15 degrees is 1.665, a brightness difference at a downward shift of 15 degrees is 1.5717, and a maximum value of the two brightness differences is 1.665 which is less than 1.73 is taken according to the vertical viewing angle requirement, so the vertical viewing angle requirement is met in this case; a brightness difference at a leftward shift of 30 degrees is 2.5343, a brightness difference at rightward shift of 30 degrees is 2.6853, and an average value of the two brightness differences is 2.6098 which is greater than 1.73 is taken according to the horizontal viewing angle requirement, so the horizontal viewing angle requirement is not met in this case.

In the case where L1=50 μm, a brightness difference at an upward shift of 15 degrees is 1.8047, a brightness difference at a downward shift of 15 degrees is 1.4542, and a maximum value of the two brightness differences is 1.8047 which is greater than 1.73 is taken according to the vertical viewing angle requirement, so the vertical viewing angle requirement is not met in this case; a brightness difference at a leftward shift of 30 degrees is 2.7512, a brightness difference at a rightward shift of 30 degrees is 2.8327, and an average value of the two brightness differences is 2.792 which is greater than 1.73 is taken according to the horizontal viewing angle requirement, so the horizontal viewing angle requirement is not met in this case.

In addition, in conjunction with FIG. 5, it will be seen from the curves of brightness versus horizontal viewing angle from negative 85 degrees to positive 85 degrees (−85 degrees to +85 degrees) that, in a case where L2 is kept constant at 50 μm (L2=50 μm), the central brightness increases with an increase of L1. For example, when L1 increases from 24 μm to 50 μm, the brightness increases by more than 6%, while the horizontal viewing angle and the vertical viewing angle become worse. For example, in cases where L1 is separately 38 μm and 50 μm, values of the brightness in the horizontal viewing angle are respectively 2.6098 and 2.792, which are much greater than 1.73. Therefore, in the case where both the first intersection line and the second intersection line are set to be horizontal, and L2=50 μm, by setting L1 to 24 μm (L1=24 μm), the horizontal viewing angle requirement and vertical viewing angle requirement may be well met.

Figure 6:
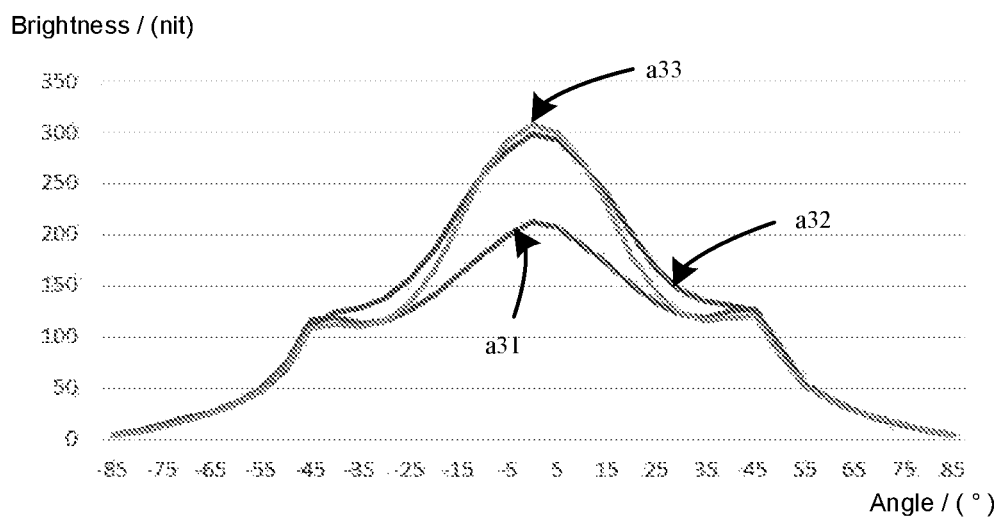
FIG. 6 is a comparison diagram of curves of brightness versus horizontal viewing angle for another three dimming assemblies, in accordance with some embodiments of the present disclosure.

With reference to Table 3 and FIG. 6, by taking an example where both the first intersection line and the second intersection line to be horizontal, and L1 is 24 μm (L1=24 μm), Table 3 shows experimental data in three cases where L2 is separately 24 μm, 38 μm and 50 μm. FIG. 6 shows a comparison diagram of curves of brightness versus horizontal viewing angle for the three cases in Table 3, where α31 is a curve of brightness versus horizontal viewing angle for the case where L2=24 μm, α32 is a curve of brightness versus horizontal viewing angle for the case where L2=38 μm, and α33 is a curve of brightness versus horizontal viewing angle for the case where L2=50 μm.

TABLE 3

| L2 | Viewing angle | Lmax | Lmin | Brightness difference (Lmax/Lmin) | Result |
|---|---|---|---|---|---|
| 24 μm | Left 30 degrees | 133.9 | 107.7 | 1.2433 | |
| | Right 30 degrees | 130.8 | 99.93 | 1.3089 | |
| | Horizontal viewing angle | Standard value ≤ 1.73 | | 1.2761 | Qualified |
| | Up 15 degrees | 207.5 | 197.7 | 1.0496 | |
| | Down 15 degrees | 208.3 | 205.2 | 1.0151 | |
| | Vertical viewing angle | Standard value ≤ 1.73 | | 1.0496 | Qualified |
| 38 μm | Left 30 degrees | 185.9 | 113.6 | 1.6364 | |
| | Right 30 degrees | 181.2 | 106 | 1.7094 | |
| | Horizontal viewing angle | Standard value ≤ 1.73 | | 1.6729 | Qualified |
| | Up 15 degrees | 232 | 190.4 | 1.2185 | |
| | Down 15 degrees | 234 | 193.1 | 1.2118 | |
| | Vertical viewing angle | Standard value ≤ 1.73 | | 1.2185 | Qualified |
| 50 μm | Left 30 degrees | 169.9 | 103.8 | 1.6368 | |
| | Right 30 degrees | 165.3 | 97.05 | 1.7032 | |
| | Horizontal viewing angle | Standard value ≤ 1.73 | | 1.67 | Qualified |
| | Up 15 degrees | 229.7 | 187.6 | 1.2244 | |
| | Down 15 degrees | 226.8 | 194.6 | 1.1655 | |
| | Vertical viewing angle | Standard value ≤ 1.73 | | 1.2244 | Qualified |

It will be seen from Table 3 that, in the case where L2=24 μm, a brightness difference at an upward shift of 15 degrees is 1.0496, a brightness difference at a downward shift of 15 degrees is 1.0151, and a maximum value of the two brightness differences is 1.0496 which is less than 1.73 is taken according to the vertical viewing angle requirement, so the vertical viewing angle requirement is met in this case; a brightness difference at a leftward shift of 30 degrees is 1.2433, a brightness difference at a rightward shift of 30 degrees is 1.3089, and an average value of the two brightness differences is 1.2761 which is less than 1.73 is taken according to the horizontal viewing angle requirement, so the horizontal viewing angle requirement is also met in this case.

In the case where L2=38 μm, a brightness difference at an upward shift of 15 degrees is 1.2185, a brightness difference at a downward shift of 15 degrees is 1.2118, and a maximum value of the two brightness differences is 1.2185 which is less than 1.73 is taken according to the vertical viewing angle requirement, so the vertical viewing angle requirement is met in this case; a brightness difference at a leftward shift of 30 degrees is 1.6364, a brightness difference at a rightward shift of 30 degrees is 1.7094, and an average value of the two brightness differences is 1.6729 which is less than 1.73 is taken according to the horizontal viewing angle requirement, so the horizontal viewing angle requirement is also met in this case.

In the case where L2=50 μm, a brightness difference at an upward shift of 15 degrees is 1.2244, a brightness difference at a downward shift of 15 degrees is 1.1655, and a maximum value of the two brightness differences is 1.2244 which is less than 1.73 is taken according to the vertical viewing angle requirement, so the vertical viewing angle requirement is met in this case; a brightness difference at a leftward shift of 30 degrees is 1.6368, a brightness difference at a right-ward shift of 30 degrees is 1.7032, and an average value of the two brightness differences is 1.67 which is less than 1.73 is taken according to the horizontal viewing angle requirement, so the horizontal viewing angle requirement is also met in this case.

Therefore, in a case where L1 is kept constant at 24 μm (L1=24 μm), for the second prisms with different L2, the brightness in the viewing angle varies greatly. That is, the brightness difference in the horizontal viewing angle and the brightness difference in the vertical viewing angle decrease as L2 of the second prism decreases. Therefore, the viewing angle may be effectively widened by reducing L2 of the second prism. However, in conjunction with FIG. 6, it will be seen from the curves of brightness versus horizontal viewing angle from −85 degrees to +85 degrees, when L2 decreases, the center brightness also decreases. In particular, when L2 decreases from 38 μm to 24 μm, the brightness decreases by nearly 30%, which may no longer meet a normal brightness requirement, so that this case is unusable.

According to the above analysis, magnitudes of L1 and L2 have great influences on the viewing angles. The larger L1 and L2 are, the larger the brightness gain is. For example, in a case where L1 is large (for example, L1 is 38 μm or 50 μm), the first prism 1 has a relatively high brightness gain, but shading properties are poor, the viewing angle is severely narrowed, which is difficult to meet the horizontal viewing angle requirement. Therefore, L1 may be in a range of 20 μm to 28 μm, inclusive. For example, L1 is 20 μm, 24 μm, or 28 μm. In this case, although the brightness gain is not as good as that of the first prism with L1 of 38 μm or 50 μm, good shielding properties and a larger viewing angle are achieved. In addition, because of the good shielding properties, it may be possible to improve a reflection problem of the rubber frame. The "reflection problem of the rubber frame" refers to a phenomenon where an inverted image of the rubber frame appears at an edge of the display region under an action of optical films (such as the DDP structure), which results in a dark gray line or a black line viewed from a certain angle, thereby affecting quality of images to be displayed.

In the case where L1 is 24 μm, although there is a good viewing angle effect when L2=24 μm, brightness loss is large, which does not meet requirements. Therefore, in order to ensure the brightness and the viewing angle to meet the requirements, L2 may be set in a range of 30 μm to 60 μm, inclusive according to different product requirements. For example, in the case where L2=38 μm, it may be possible to achieve a good shielding effect; and in the case where L2=50 μm, it may be possible to achieve a high brightness gain.

In some embodiments, with reference to FIG. 1A, an acute angle between an orthographic projection of the first intersection line 112 on the second surface M2 and an orthographic projection of the second intersection line 212 on the second surface M2 is less than 10 degrees.

vertical viewing angle are both greater than 1.73). In these embodiments, by setting the acute angle between the orthographic projection of the first intersection line 112 on the second surface M2 and the orthographic projection of the second intersection line 212 on the second surface M2 to be less than 10 degrees, it may be possible to increase the brightness gain in a case where the horizontal viewing angle requirement and the vertical viewing angle requirement are met. That is, a dual gain of brightness and viewing angle is realized.

With reference to Table 4, by taking an example where L1 is 24 μm (L1=24 μm), L2 is 50 μm (L2=50 μm), and the second intersection line 212 is set to be horizontal, Table 4 shows experimental data in three cases where the acute angle between the orthographic projection of the first intersection line 112 on the second surface M2 and the orthographic projection of the second intersection line 212 on the second surface M2 is 0 degrees, 5 degrees and 10 degrees, respectively.

TABLE 4

| Acute angle | Viewing angle | Lmax | Lmin | Brightness difference (Lmax/Lmin) | Result |
|---|---|---|---|---|---|
| 0° | Left 30 degrees | 169.9 | 103.8 | 1.6368 | |
| | Right 30 degrees | 165.3 | 97.05 | 1.7032 | |
| | Horizontal viewing angle | Standard value ≤ 1.73 | | 1.67 | Qualified |
| | Up 15 degrees | 229.7 | 187.6 | 1.2244 | |
| | Down 15 degrees | 226.8 | 194.6 | 1.1655 | |
| | Vertical viewing angle | Standard value ≤ 1.73 | | 1.2244 | Qualified |
| 5° | Left 30 degrees | 169.6 | 105.1 | 1.6137 | |
| | Right 30 degrees | 1.68.5 | 95.99 | 1.7554 | |
| | Horizontal viewing angle | Standard value ≤ 1.73 | | 1.6846 | Qualified |
| | Up 15 degrees | 228.5 | 190.6 | 1.1988 | |
| | Down 15 degrees | 230.5 | 195.8 | 1.1772 | |
| | Vertical viewing angle | Standard value ≤ 1.73 | | 1.1988 | Qualified |
| 10° | Left 30 degrees | 177.8 | 101.5 | 1.7517 | |
| | Right 30 degrees | 167.5 | 97.23 | 1.7227 | |
| | Horizontal viewing angle | Standard value ≤ 1.73 | | 1.7372 | Unqualified |
| | Up 15 degrees | 232.7 | 194.1 | 1.1989 | |
| | Down 15 degrees | 233.1 | 196 | 1.1893 | |
| | Vertical viewing angle | Standard value ≤ 1.73 | | 1.1989 | Qualified |

It will be noted that, in a case where the orthographic projection of the first intersection line 112 on the second surface M2 is perpendicular to the orthographic projection of the second intersection line 212 on the second surface M2, for example, the first intersection line 112 is set to be horizontal, and the second intersection line 212 is set vertical, compared with the case where the first intersection line 112 and the second intersection line 212 are both set to be horizontal, it may be possible to achieve a brightness gain increased by more than 20% through the first prism 1 and the second prism 2. However, neither the horizontal viewing angle nor the vertical viewing angle can meet the requirements (for example, the brightness difference in the horizontal viewing angle and the brightness difference in the It will be seen from Table 1 that, in a case where the acute angle between the orthographic projection of the first intersection line 112 on the second surface M2 and the orthographic projection of the second intersection line 212 on the second surface M2 is 0 degrees, a brightness difference at an upward shift of 15 degrees is 1.2244, a brightness difference at a downward shift of 15 degrees is 1.1655, and a maximum value of the two brightness differences 1.2244 which is less than 1.73 is taken according to the vertical viewing angle requirement, so the vertical viewing angle requirement is met in this case; a brightness difference at a leftward shift of 30 degrees is 1.6368, a brightness difference at a rightward shift of 30 degrees is 1.7032, and an average value of the two brightness differences 1.67 which is less than 1.73 is taken according to the horizontal viewing angle requirement, so the horizontal viewing angle requirement is also met in this case.

In a case where the acute angle between the orthographic projection of the first intersection line 112 on the second surface M2 and the orthographic projection of the second intersection line 212 on the second surface M2 is 5 degrees, a brightness difference at an upward shift of 15 degrees is 1.1988, a brightness difference at a downward shift of 15 degrees is 1.1772, and a maximum value of the two brightness differences is 1.1988 which is less than 1.73 is taken according to the vertical viewing angle requirement, so the vertical viewing angle requirement is met in this case; a brightness difference at a leftward shift of 30 degrees is 1.6137, a brightness difference at rightward shift of 30 degrees is 1.7554, and an average value of the two brightness differences is 1.6846 which is less than 1.73 is taken according to the horizontal viewing angle requirement, so the horizontal viewing angle requirement is also met in this case.

In a case where the acute angle between the orthographic projection of the first intersection line 112 on the second surface M2 and the orthographic projection of the second intersection line 212 on the second surface M2 is 10 degrees, a brightness difference at an upward shift of 15 degrees is 1.1989, a brightness difference at a downward shift of 15 degrees is 1.1893, and a maximum value of the two brightness differences is 1.1989 which is less than 1.73 is taken according to the vertical viewing angle requirement, so the vertical viewing angle requirement is met in this case; a brightness difference at a leftward shift of 30 degrees is 1.7517, a brightness difference at a rightward shift of 30 degrees is 1.7227, and an average value of the two brightness differences is 1.7372 which is greater than 1.73 is taken according to the horizontal viewing angle requirement, so the horizontal viewing angle requirement is not met in this case.

Therefore, when the brightness gain increases with an increase of the acute angle, the brightness difference in the horizontal viewing angle will also increase. For example, when the acute angle increases from 0 degrees to 10 degrees, the center brightness increases from 300 nits to 310 nits, but the horizontal viewing angle requirement will not be met in this case. In these embodiments, by setting the acute angle between the orthographic projection of the first intersection line 112 on the second surface M2 and the orthographic projection of the second intersection line 212 on the second surface M2 to be less than 10 degrees, it may be possible to well meet the horizontal viewing angle requirement and the vertical viewing angle requirement. In addition, in a case where the acute angle between the orthographic projection of the first intersection line 112 on the second surface M2 and the orthographic projection of the second intersection line 212 on the second surface M2 is close to 10 degrees (e.g., 9 degrees or 9.5 degrees), it may not only meet the horizontal viewing angle requirement and the vertical viewing angle requirement, but also effectively improve the brightness gain of the liquid crystal display device.

Figure 7:
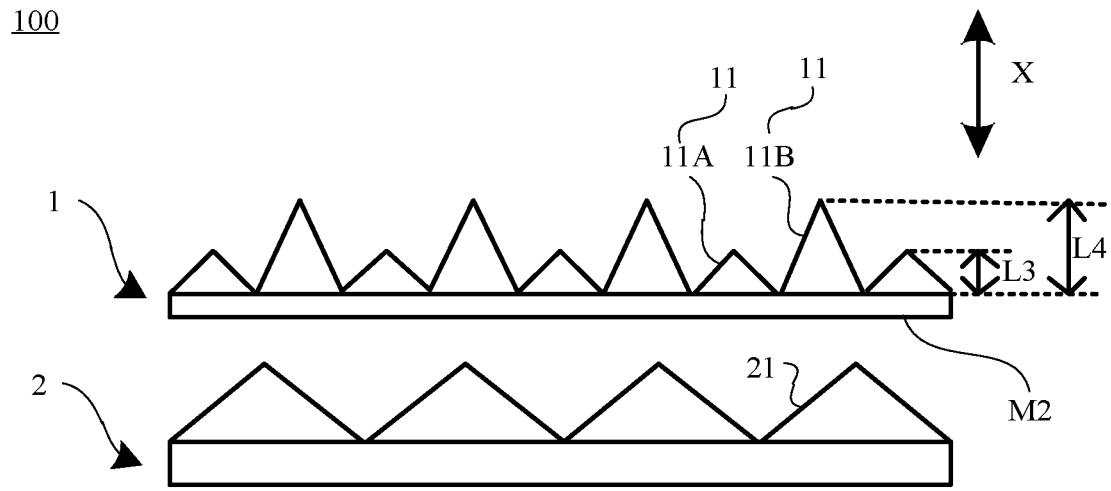
FIG. 7 is a structural diagram of another dimming assembly, in accordance with some embodiments of the present disclosure.
Figure 8:
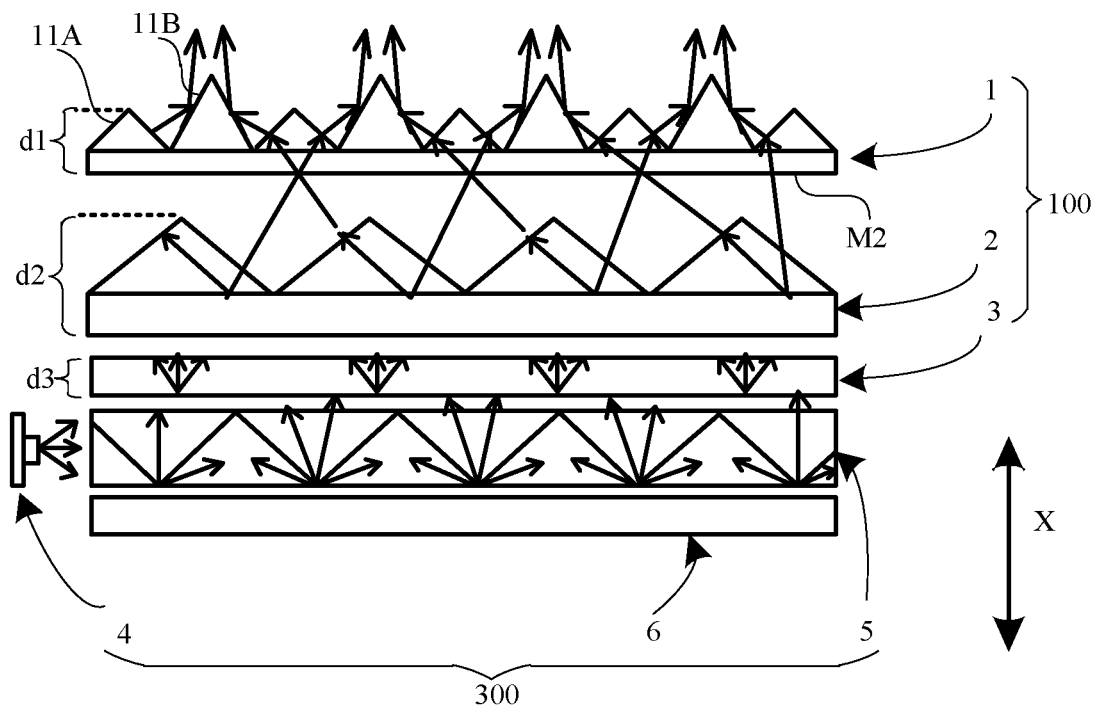
FIG. 8 is a structural diagram of another backlight module, in accordance with some embodiments of the present disclosure.

In some embodiments, as shown in FIGS. 7 and 8, the plurality of first dimming portions 11 include first-type dimming portions 11A and second-type dimming portions 11B. A dimension L3 of the first-type dimming portion 11A in a direction X perpendicular to the second surface M2 is less than a dimension L4 of the second-type dimming portion 11B in the direction X perpendicular to the second surface M2. Such a design improves the light-gathering effect of the first prism 1, which is possible to improve the brightness gain of the liquid crystal display device.

For example, as shown in FIGS. 7 and 8, the first-type dimming portions 11A and the second-type dimming portions 11B are alternately arranged in sequence. In this case, it may not only improve the light-gathering effect of the first prism 1, but also improve the light-emitting uniformity of the first prism 1, so that the liquid crystal display device may have advantages of high gain and wide viewing angle.

Figure 9A:
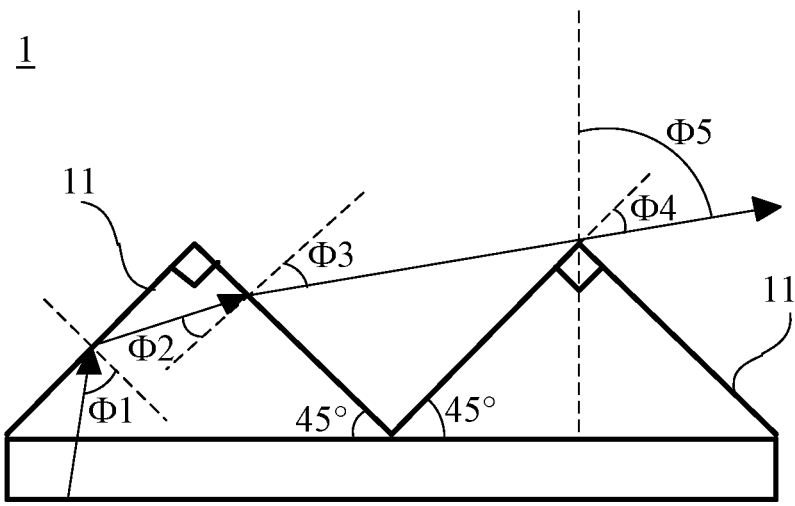
FIG. 9A is a light path diagram of a first prism, in accordance with some embodiments of the present disclosure.
Figure 9B:
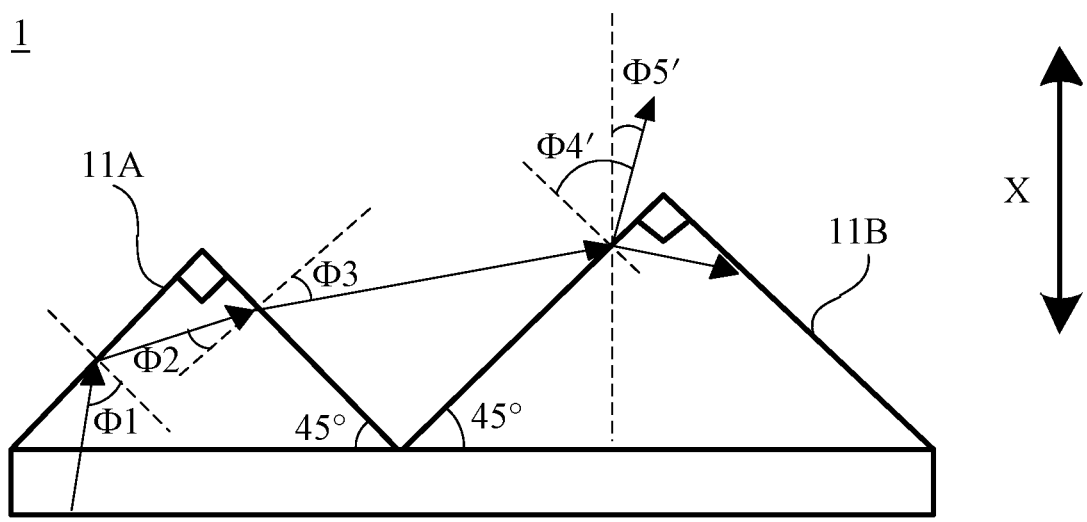
FIG. 9B is a light path diagram of another first prism, in accordance with some embodiments of the present disclosure.

With reference to FIGS. 9A and 9B, let a refractive index of the first prism 1 be n, and a refractive index of air be 1, a total reflection critical angle is ($\phi$): c=arcsin (1/n).

As shown in FIG. 9A, in a case where an incident angle $\phi$1 is greater than $\phi$, light inside the first prism 1 is totally reflected on one first side surface of the first dimming portion 11, and may be directed to the other first side surface of the first dimming portion 11. According to laws of triangles, an incident angle $\phi$2 when the light incident on the other first side surface is equal to 90 degrees minus $\phi$1 ($\phi$2=90 degrees−$\phi$1). In a case where $\phi$2 is less than or equal to ($\phi$), the light may be refracted outward from the other first side surface. In this case, according to the law of refraction, it will be seen that, a refraction angle $\phi$3 satisfies: $\phi$3=arcsin (n×sin $\phi$2). Assuming that outgoing light passes by a position of an edge of an adjacent first dimming portion 11 without being blocked, thus the outgoing light will not be reflected or refracted. According to the laws of triangles, it will be seen that, $\phi$4 is equal to $\phi$3 ($\phi$4=$\phi$3), and an angle $\phi$5 of final outgoing light deviating from a vertical direction is equal to a sum of 45 degrees and $\phi$4 ($\phi$5=45 degrees+$\phi$4). That is, $\phi$5 is great than 45 degrees ($\phi$5>45 degrees).

For a case where the first prism 1 includes the first dimming portions 11A and the second-type dimming portions 11B, as shown in FIG. 9B, since the dimension of the second-type dimming portion 11B in the direction X perpendicular to the second surface M2 is greater than the dimension of the first-type dimming portion 11A in the direction X perpendicular to the second surface M2, the outgoing light directed to a position of a prism peak of an adjacent first dimming portion will be reflected by the second-type dimming portion 11B. In this case, according to the laws of triangles, in the example shown in FIG. 9B, an angle $\phi$5' of final outgoing light deviating from the vertical direction is equal to $\phi$4' minus 45 degrees ($\phi$5'=$\phi$4'−45 degrees). That is, $\phi$5' is less than 45 degrees ($\phi$5'<45 degrees).

According to the above analysis, it will be seen that, in the case where the first prism 1 includes the first dimming portions 11A and the second-type dimming portions 11B, it may be possible to achieve a good light-gathering effect, which is beneficial to increase the brightness gain.

In some embodiments, with reference to FIGS. 2 and 8, the dimming assembly 100 further includes a diffusion sheet 3 disposed on a side of the second prism 2 away from the first prism 1. The diffusion sheet 3 is configured to diffuse light passing therethrough, and direct the diffused light to the second prism 2. In these embodiments, by providing the diffusion sheet 3, it may be possible to enable light emitted by a point light source or a linear light source to form a surface light source by diffusing, so that the backlight module 200 may provide the surface light source with sufficient brightness and uniform distribution.

For example, a dimension d3 of the diffusion sheet 3 in the direction X perpendicular to the second surface M2 is approximately 0.125 mm. Here, the "approximately" refers to that a value may fluctuate up or down by ten percent. That is to say, a value of d3 may be in a range of 0.1125 mm to 0.1375 mm, inclusive. For example, d3 is 0.1125 mm, 0.125 mm, or 0.1375 mm. In this case, the diffusion sheet 3 is relatively thin, and a cost is relatively low, which in turn is beneficial to reduce a thickness and a manufacturing cost of the dimming assembly 100.

In some other examples, the dimension d3 of the diffusion sheet 3 in the direction X perpendicular to the second surface M2 is approximately 0.145 mm. Here, "approximately" refers to that a value may fluctuate up or down by ten percent. That is to say, a value of d3 may be in a range of 0.1305 mm to 0.1595 mm, inclusive. For example, d3 is 0.1305 mm, 0.145 mm, or 0.1595 mm. In this case, the diffusion sheet 3 has high wrinkle resistance and light shielding properties.

With reference to Table 5, by taking an example where the first intersection line and the second intersection line are both set to be horizontal, L1 is 24 μm (L1=24 μm), and L2 is 50 μm (L2=50 μm), Table 5 shows experimental data corresponding to two kinds of diffusion sheets with d3 of 0.145 mm and 0.125 mm.

TABLE 5

| d3 | Viewing angle | Lmax | Lmin | Brightness difference (Lmax/Lmin) | Result |
|---|---|---|---|---|---|
| 145 mm | Left 30 degrees | 169.9 | 103.8 | 1.6368 | |
| | Right 30 degrees | 165.3 | 97.05 | 1.7032 | |
| | Horizontal viewing angle | Standard value ≤ 1.73 | | 1.67 | Qualified |
| | Up 15 degrees | 229.7 | 187.6 | 1.2244 | |
| | Down 15 degrees | 226.8 | 194.6 | 1.1655 | |
| | Vertical viewing angle | Standard value ≤ 1.73 | | 1.2244 | Qualified |
| 125 mm | Left 30 degrees | 173.8 | 104.1 | 1.6695 | |
| | Right 30 degrees | 167.5 | 97.84 | 1.712 | |
| | Horizontal viewing angle | Standard value ≤ 1.73 | | 1.6908 | Qualified |
| | Up 15 degrees | 226.2 | 193.2 | 1.1708 | |
| | Down 15 degrees | 224.1 | 191.2 | 1.1721 | |
| | Vertical viewing angle | Standard value ≤ 1.73 | | 1.1721 | Qualified |

It will be seen from Table 5 that, the diffusion sheets of different thicknesses (that is, the diffusion sheet with d3 of 145 mm and the diffusion sheet with d3 of 125 mm) may achieve comparable effects of brightness and comparable effects of viewing angle, and all meet the horizontal viewing angle requirement and the vertical viewing angle requirement.

In some embodiments, with reference to FIGS. 2 and 8, a maximum dimension d1 of the first prism 1 in the direction X perpendicular to the second surface M2 is approximately 0.115 mm; and/or a maximum dimension d2 of the second prism 2 in the direction perpendicular to the second surface M2 is approximately 0.28 mm. Here, the "approximately" refers to that a value may fluctuate up or down by ten percent. That is to say, a value of d1 may be in a range of 0.1035 mm to 0.1265 mm, inclusive. For example, d1 is 0.1035 mm, 0.115 mm, or 0.1265 mm. A value of d2 may be in a range of 0.252 mm to 0.308 mm, inclusive. For example, d2 is 0.252 mm, 0.28 mm, or 0.308 mm. In this case, not only is an effect of the dual gain of brightness and viewing angle achieved, but also an overall thickness of the formed dimming assembly 100 is enabled to be small, which in turn facilitates realizing a light and thin design of the backlight module and the liquid crystal display device.

Hereinafter, the dimming assembly including the first prism 1, the second prism 2 and the diffusion sheet 3 in these embodiments is referred to as a DPP structure for short.

Table 6 shows brightness experimental data of the DPP structure and the DDP structure in an example.

TABLE 6

| Location | DDP structure Brightness (nit) | DPP structure Brightness (nit) | Brightness gain |
|---|---|---|---|
| Position 1 | 258.50 | 277.03 | 1.07 |
| Position 2 | 251.80 | 273.55 | 1.09 |
| Position 3 | 254.10 | 275.29 | 1.08 |
| Position 4 | 251.30 | 277.74 | 1.11 |
| Position 5 | 281.90 | 310.89 | 1.10 |
| Position 6 | 241.30 | 263.01 | 1.09 |

TABLE 6-continued

| Location | DDP structure Brightness (nit) | DPP structure Brightness (nit) | Brightness gain |
|---|---|---|---|
| Position 7 | 261.30 | 286.75 | 1.10 |
| Position 8 | 255.00 | 286.24 | 1.12 |
| Position 9 | 237.20 | 262.09 | 1.10 |
| Average value | 254.71 | 279.18 | 1.10 |
| Uniformity | 84.14% | 84.30% | |

According to Table 6, it will be seen that, compared with the DDP structure in an example, the brightness gain at most of positions of the DPP structure in these embodiments is increased by more than 10%. For example, the center brightness of the display region (that is, brightness at the position 5) is increased from 281.90 nits to 310 nits, and good uniformity may be still maintained. Therefore, the brightness gain of the DPP structure has a strong advantage in high energy efficiency.

Figure 10:
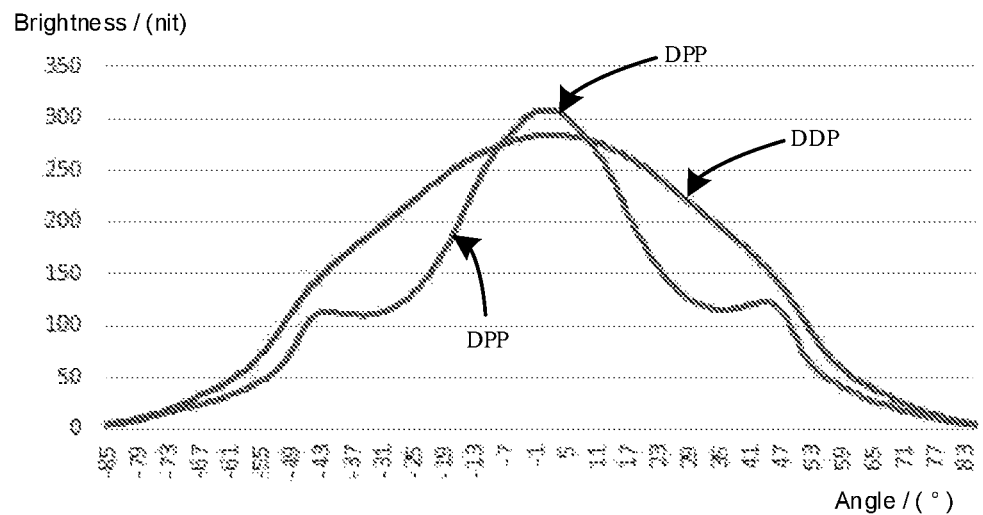
FIG. 10 is a comparison diagram of curves of brightness versus horizontal viewing angle for a DPP (diffusion sheet-prism-prism) structure and a DDP (diffusion sheet-diffusion sheet-prism) structure, in accordance with some embodiments of the present disclosure.
Figure 11:
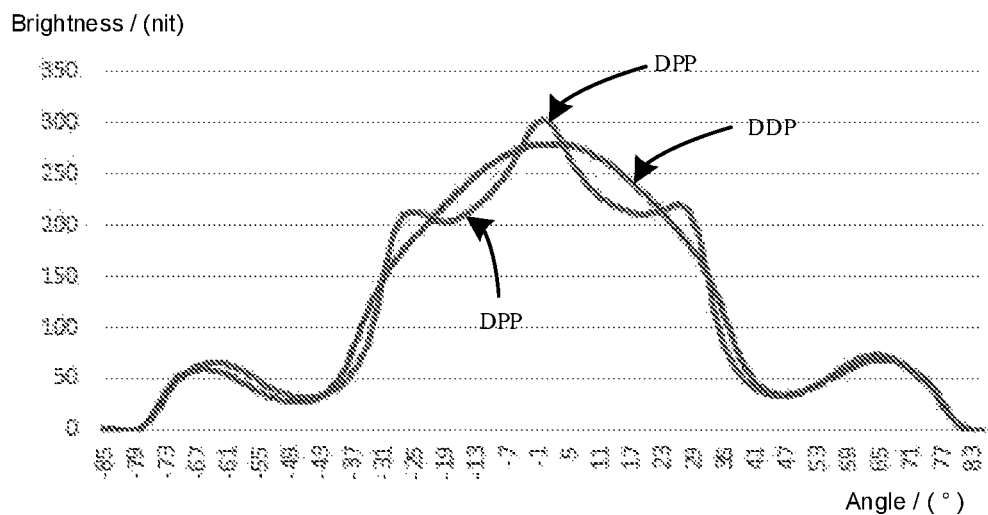
FIG. 11 is a comparison diagram of curves of brightness versus vertical viewing angle for a DPP structure and a DDP structure, in accordance with some embodiments of the present disclosure.

With reference to Table 7 and FIGS. 10 and 11, Table 7 shows brightness experimental data of a DPP structure with d1 of 0.115 mm (d1=0.115 mm), d2=0.28 mm (d2=0.28 mm), and d3=0.125 mm (d3=0.125 mm), and a DDP structure in which thicknesses of two diffusion sheets and a prism are respectively 0.125 mm, 0.28 mm and 0.115 mm in an example. FIG. 10 shows a comparison diagram of curves of brightness versus horizontal viewing angle for the DPP structure and the DDP structures in Table 7. FIG. 11 shows a comparison diagram of curves of brightness versus vertical viewing angle for the DPP structure and the DDP structure in Table 7.

TABLE 7

| Viewing angle | Lmax | Lmin | DPP Brightness difference (Lmax/Lmin) | Result | Lmax | Lmin | DDP Brightness difference (Lmax/Lmin) | Result |
|---|---|---|---|---|---|---|---|---|
| Left 30 degrees | 174.3 | 104.5 | 1.67 | | 222 | 150.7 | 1.47 | |
| Right 30 degrees | 167.5 | 97.2 | 1.72 | | 223.9 | 138.2 | 1.62 | |
| Horizontal viewing angle | Standard value ≤ 1.73 | | 1.70 | Qualified | Standard value ≤ 1.73 | | 1.55 | Qualified |
| Up 15 degrees | 226.2 | 187.4 | 1.21 | | 246.8 | 186 | 1.33 | |
| Down 15 degrees | 227.6 | 196.7 | 1.16 | | 251.3 | 197.2 | 1.27 | |
| Vertical viewing angle | Standard value ≤ 1.73 | | 1.21 | Qualified | Standard value ≤ 1.73 | | 1.33 | Qualified |

It will be seen from Table 7 that compared with the DDP structure, the DPP structure provided in these embodiments has a smaller brightness difference in the vertical viewing angle. Therefore, the horizontal viewing angle requirement and the vertical viewing angle requirement are met, and the DPP structure is more advantageous in the brightness difference in the vertical viewing angle.

In conjunction with FIGS. 10 and 11, it will be seen from the curves of brightness versus horizontal viewing angle from negative 85 degrees to positive 83 degrees and the curves of brightness versus vertical viewing angle from negative 85 degrees to positive 83 degrees that, a center brightness of the DPP structure is greater than a center brightness of the DDP structure, and the DPP structure has a better light-gathering effect. For the DPP structure provided in these embodiments, the brightness starts to fall gently at horizontal viewing angles of positive 22 degrees and negative 22 degrees (±22 degrees), rise at horizontal viewing angles of positive 34 degrees and negative 34 degrees (±34 degrees), and fall again after horizontal viewing angles of positive 46 degrees and negative 46 degrees (±46 degrees), so that the horizontal viewing angle requirement may be well met; and the brightness falls gently at a vertical viewing angle of 10 degrees, rises at a vertical viewing angle of 19 degrees, and falls again after a vertical viewing angle of 25 degrees, so the vertical viewing angle requirements may be well met.

Some embodiments of the present disclosure provide a backlight module 200. With reference to FIGS. 2 and 8, the backlight module 200 includes the dimming assembly 100 as described in any one of the above embodiments, and a light source assembly 300 configured to emit light to the dimming assembly 100. For example, as shown in FIGS. 2 and 8, the light emitted by the light source assembly 300 sequentially pass through the diffusion sheet 3, the second prism 2 and the first prism 1 of the dimming assembly 100.

Since the backlight module 200 in these embodiments includes the dimming assembly 100 as described in any one of the above embodiments, the backlight module 200 has all beneficial effects as described above. For example, compared with a backlight module adopting the DDP structure, the backlight module 200 provided in these embodiments is lighter and thinner, and has low cost and high light extraction efficiency.

For example, as shown in FIGS. 2 and 8, the light source assembly 300 includes a light guide plate 5 disposed on a side of the dimming assembly 100, a reflection plate 6 disposed on a side of the light guide plate 5 away from the dimming assembly 100, and a side-type light source 4. The side-type light source 4 is configured to direct light toward the light guide plate 5 from at least one side surface of the light guide plate 5. In this way, outgoing light from a surface of the light guide plate 5 proximate to the dimming assembly 100 may be directly incident to the dimming assembly; and outgoing light from a surface of the light guide plate 5 proximate to the reflection plate 6 is reflected by the reflection plate 6, and then may pass through the light guide plate 5 to be directed toward the dimming assembly 100. Therefore, the light source assembly 300 has high light exaction efficiency.

Figure 12:
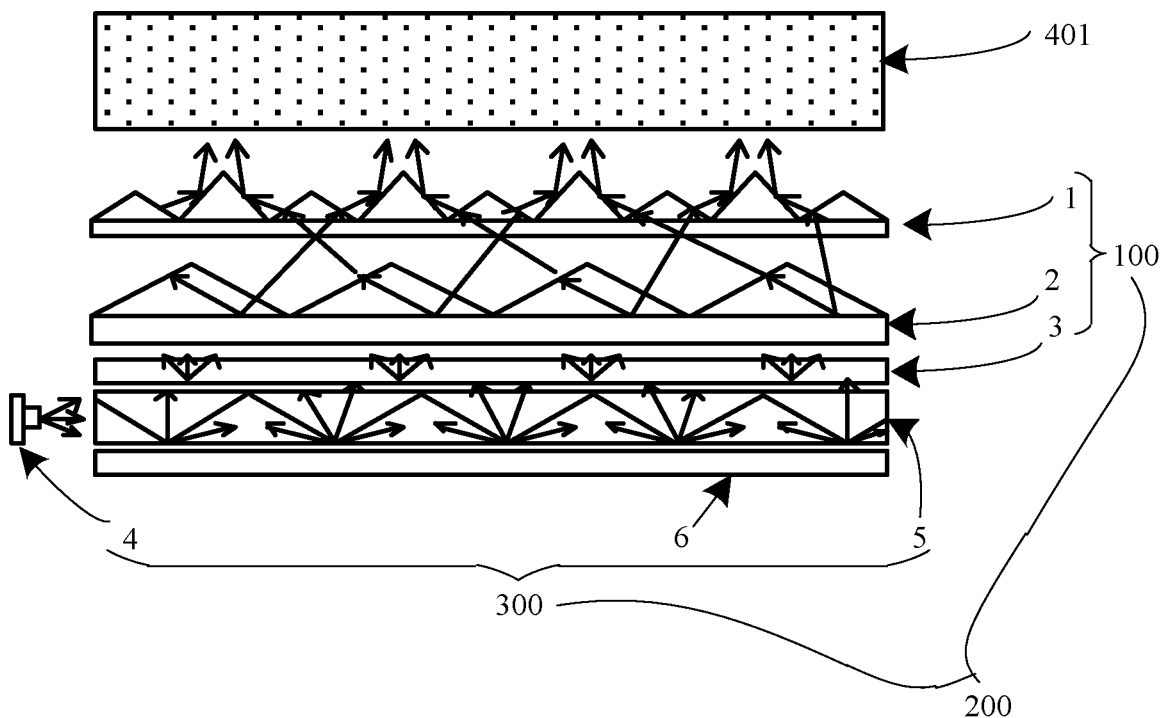
FIG. 12 is a structural diagram of a liquid crystal display device, in accordance with some embodiments of the present disclosure.

Some embodiments of the present disclosure provide a liquid display device 400. With reference to FIG. 12, the liquid display device 400 includes the backlight module 200 provided in the above embodiments, and a liquid crystal panel 401 disposed on a side of the backlight module 200. A structure of the liquid crystal panel 401 mainly includes an array substrate, an opposite substrate and a liquid layer disposed between the array substrate and the opposite substrate. In addition, it will be noted that FIG. 12 may be used to illustrate relative positions of the backlight module 200 and the liquid crystal panel 401, but does not limit actual sizes of the backlight module 200 and the liquid crystal panel 401, and a ratio of the size of the backlight module 200 to the size of the liquid crystal panel 401.

By using the backlight module 200 having the dimming assembly 100, the liquid crystal display device 400 provided in these embodiments has advantages of small thickness, low cost, high gain and wide viewing angle.

The liquid crystal display device 400 may be any product or component having a display function, such as an Augmented Reality (AR) helmet, AR glasses, a mobile phone, a tablet computer, a television, a monitor, a notebook computer, a digital photo frame and a navigator.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A dimming assembly, comprising:
a first prism having a first surface and a second surface opposite to each other, the first surface including a plurality of first dimming portions, each first dimming portion including two first side surfaces, and edges of the two first side surfaces away from the second surface intersecting at a first intersection line; and
a second prism disposed on a side where the second surface of the first prism is located, a surface of the second prism proximate to the second surface including a plurality of second dimming portions, each second dimming portion including two second side surfaces, and edges of the two second side surfaces proximate to the second surface intersecting at a second intersection line, wherein
a distance between orthographic projections of two adjacent first intersection lines on the second surface is less than a distance between orthographic projections of two adjacent second intersection lines on the second surface; and
an acute angle between an extending direction of an orthographic projection of the first intersection line on the second surface and an extending direction of an orthographic projection of the second intersection line on the second surface is greater than 0 degrees and less than 10 degrees.

2. The dimming assembly according to claim 1, wherein the plurality of first dimming portions include first-type dimming portions and second-type dimming portions; and
a dimension of a first-type dimming portion in a direction perpendicular to the second surface is less than a dimension of a second-type dimming portion in the direction perpendicular to the second surface.

3. The dimming assembly according to claim 2, wherein the first-type dimming portions and the second-type dimming portions are alternately arranged in sequence.

4. The dimming assembly according to claim 1, wherein the plurality of first dimming portions are parallel to each other; and/or
the plurality of second dimming portions are parallel to each other.

5. The dimming assembly according to claim 1, wherein one of the two first side surfaces is at a first angle to the second surface, another of the two first side surfaces is at a second angle to the second surface, and a difference between the first angle and the second angle is equal to or greater than 0 degrees and less than 0.1 times of any one of the two angles; and/or
one of the two second side surfaces is at a third angle to the second surface, another of the two second side surfaces is at a fourth angle to the second surface, and a difference between the third angle and the fourth angle is equal to or greater than 0 degrees and less than 0.1 times of any one of the two angles.

6. The dimming assembly according to claim 1, wherein an included angle between the two first side surfaces is in a range of 60 degrees to 120 degrees, inclusive; and/or
an included angle between the two second side surfaces is in a range of 60 degrees to 120 degrees, inclusive.

7. The dimming assembly according to claim 1, wherein the distance between the orthographic projections of the two adjacent first intersection lines on the second surface is in a range of 20 μm to 28 μm, inclusive; and/or
the distance between the orthographic projections of the two adjacent second intersection lines on the second surface is in a range of 30 μm to 60 μm, inclusive.

8. The dimming assembly according to claim 1, wherein a maximum dimension of the first prism in a direction perpendicular to the second surface is in a range of 0.1035 mm to 0.1265 mm, inclusive; and/or
a maximum dimension of the second prism in the direction perpendicular to the second surface is in a range of 0.252 mm to 0.308 mm, inclusive.

9. The dimming assembly according to claim 1, further comprising:
a diffusion sheet disposed on a side of the second prism away from the first prism, the diffusion sheet being configured to diffuse light transmitted therethrough, and direct diffused light toward the second prism.

10. The dimming assembly according to claim 9, wherein a dimension of the diffusion sheet in a direction perpendicular to the second surface is in a range of 0.1125 mm to 0.1375 mm, inclusive.

11. A backlight module, comprising:
the dimming assembly according to claim 1; and
a light source assembly configured to provide light and direct the light toward the dimming assembly.

12. The backlight module according to claim 11, wherein the light source assembly includes:
a light guide plate disposed on a side of the dimming assembly;
a reflection plate disposed on a side of the light guide plate away from the dimming assembly; and
a side-type light source configured to provide the light and direct the light toward the light guide plate from at least one side surface of the light guide plate.

13. A liquid crystal display device, comprising:
the backlight module according to claim 11; and
a liquid crystal panel disposed on a side of the backlight module.

14. The dimming assembly according to claim 1, wherein the acute angle is 9 degrees or 9.5 degrees.

15. The dimming assembly according to claim 7, wherein the distance between the orthographic projections of the two adjacent first intersection lines on the second surface is 24 μm; and the distance between the orthographic projections of the two adjacent second intersection lines on the second surface is 50 μm.

16. The dimming assembly according to claim 8, wherein the maximum dimension of the first prism is 0.115 mm; and/or
the maximum dimension of the second prism is 0.28 mm.

17. The dimming assembly according to claim 9, wherein a dimension of the diffusion sheet in a direction perpendicular to the second surface is in a range of 0.1305 mm to 0.1595 mm, inclusive.

18. The dimming assembly according to claim 17, wherein
the dimension of the diffusion sheet is 0.145 mm.

19. The dimming assembly according to claim 10, wherein
the dimension of the diffusion sheet is 0.125 mm.

* * * * *